Feb. 10, 1970  P. H. STUDEBAKER  3,494,426
METHOD AND APPARATUS FOR CONTROLLING ELEVATION OF
GRADERS AND SIMILAR EQUIPMENT
Filed March 17, 1966  5 Sheets-Sheet 4
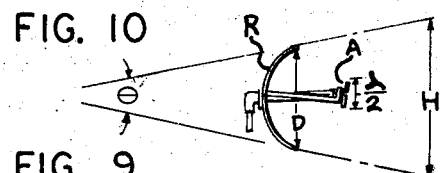
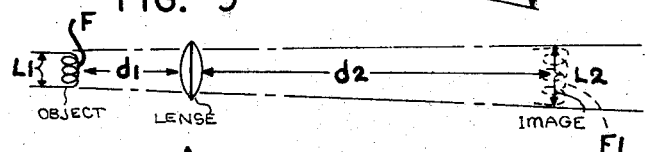
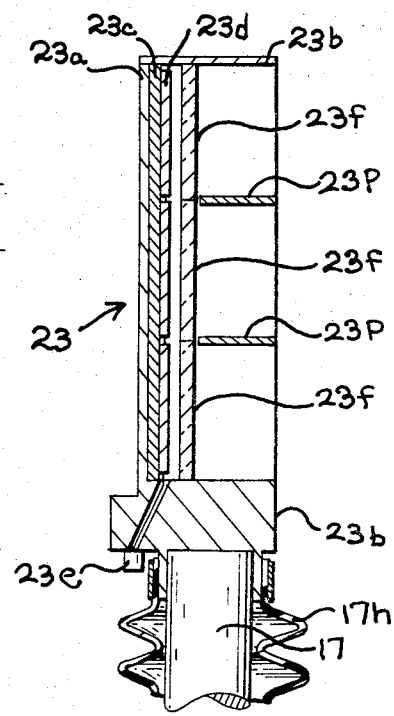
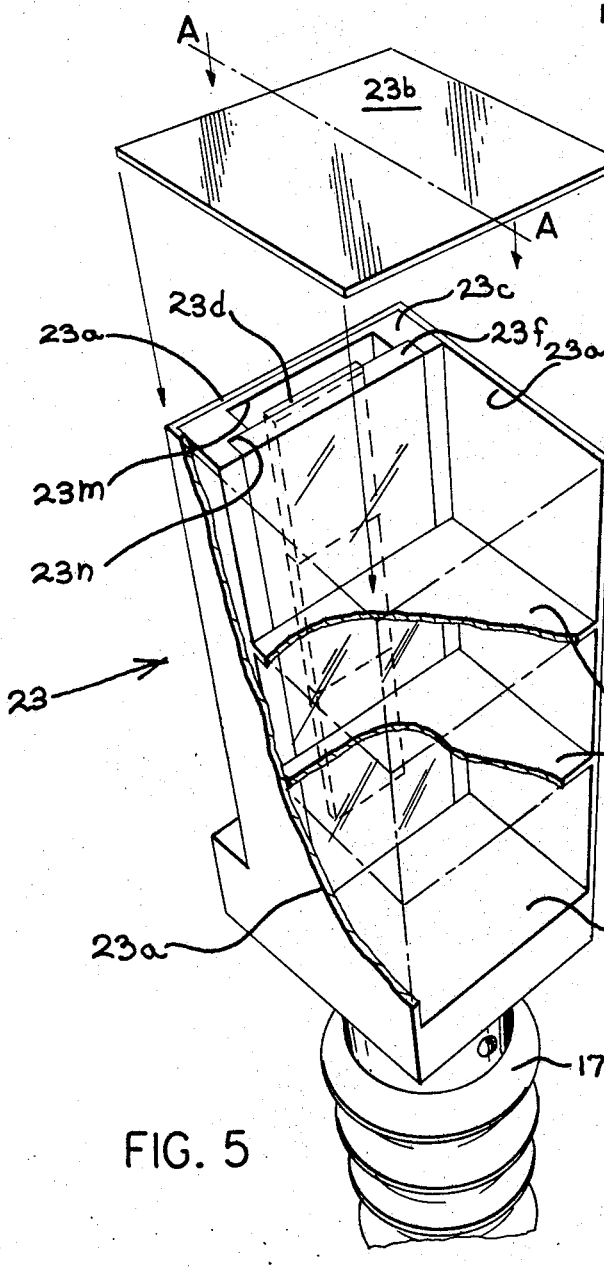
INVENTOR.
ROBERT H. STUDEBAKER
BY W. A. Schaich &
Thomas A. Meehan
ATTORNEYS

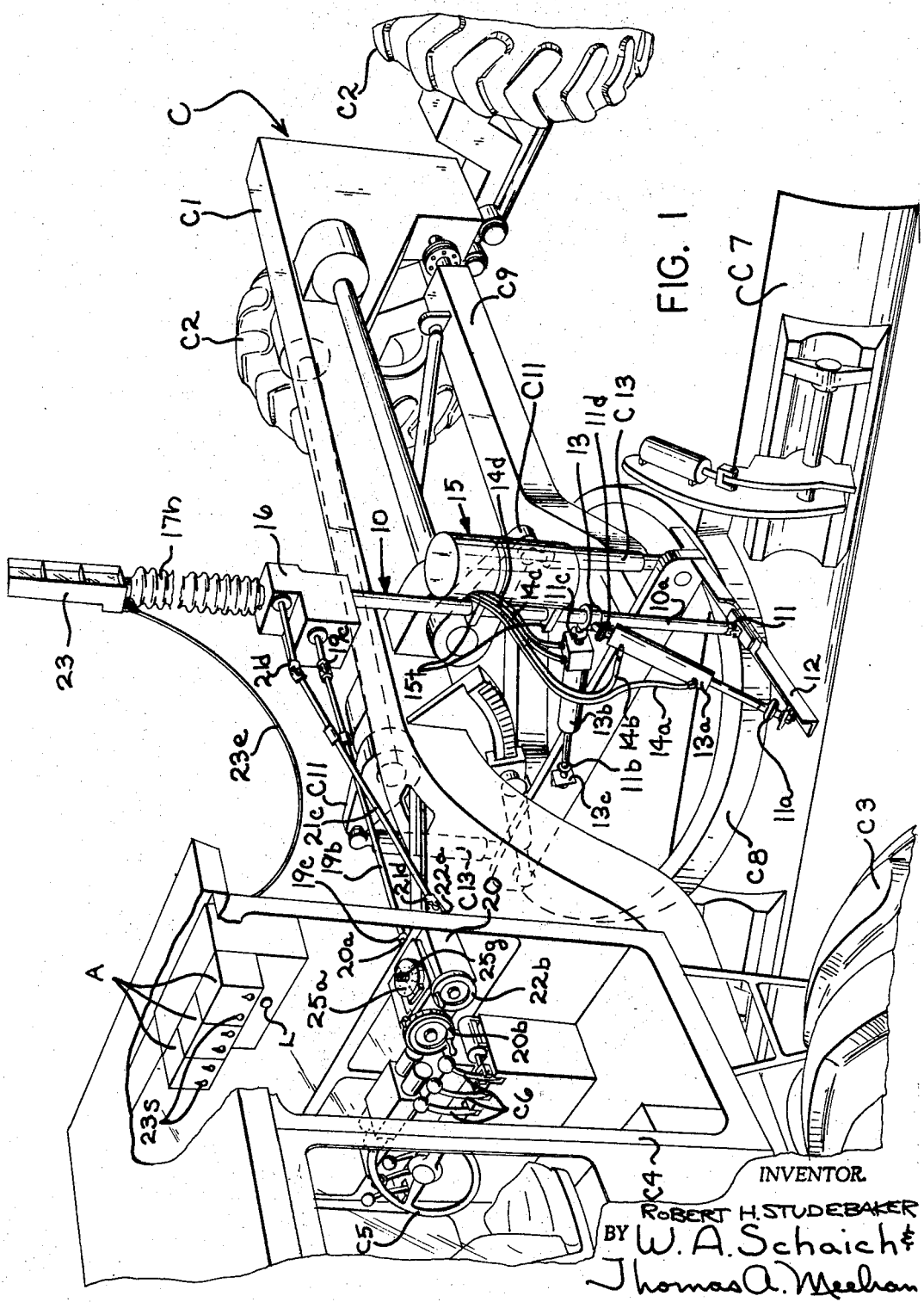

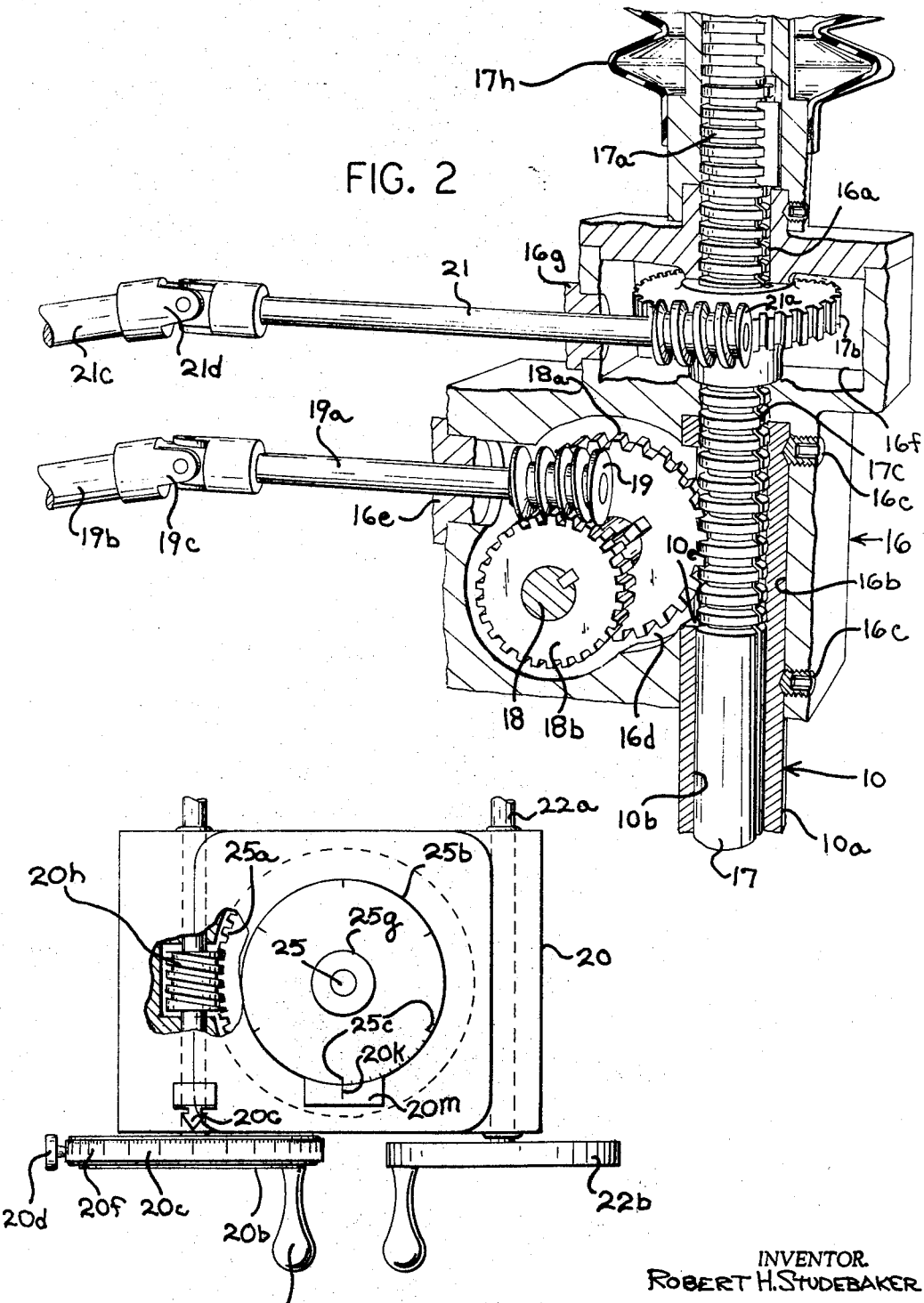

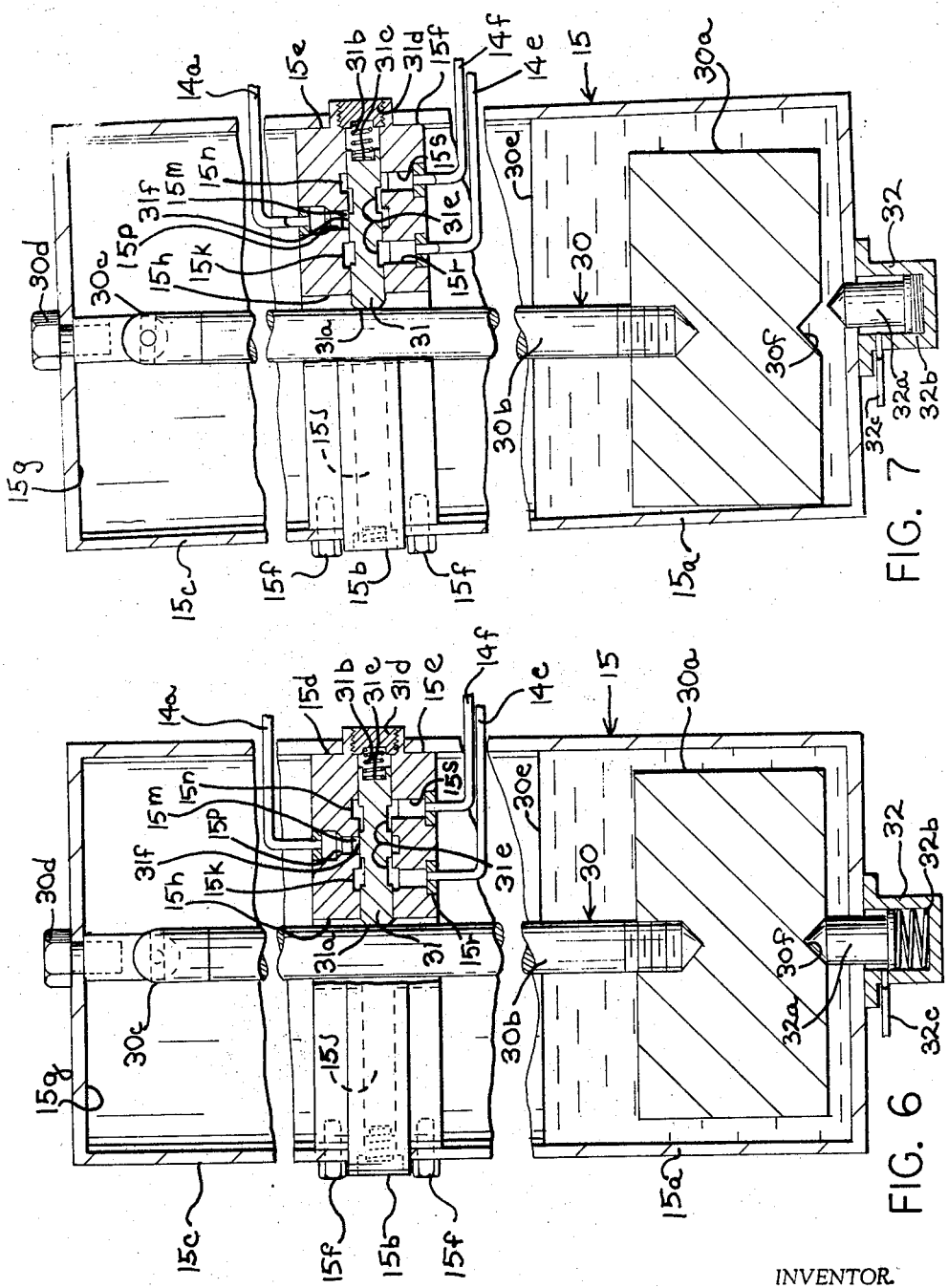

__United States Patent Office__

3,494,426
Patented Feb. 10, 1970

3,494,426
METHOD AND APPARATUS FOR CONTROLLING ELEVATION OF GRADERS AND SIMILAR EQUIPMENT
Robert H. Studebaker, Dayton, Ohio, assignor to Process Equipment Co. of Tipp City, Tipp City, Ohio, a corporation of Ohio
Continuation-in-part of application Ser. No. 468,821, July 1, 1965. This application Mar. 17, 1966, Ser. No. 535,077
Int. Cl. E02f *3/76, 3/84;* H01s *3/00*
U.S. Cl. 172—4.5                                          11 Claims

ABSTRACT OF THE DISCLOSURE

This application discloses both a method and apparatus for controlling the operations of road graders and similar equipment that require accurate elevation control of a working tool in response to a reference plane defined by an overhead laser beam moving in a fixed path above the terrain on which the equipment is operating. The disclosed apparatus permits the equipment operator to preselect the desired vertical displacement of the working tool relative to the laser beam reference plane and automatically maintains the tool at the selected relative elevation irrespective of the contour of the terrain traversed by the vehicle carrying such tool.

---

This invention relates to an improved method and apparatus for controlling the operations of road graders, earth movers, paving machines and similar equipment that require accurate elevation control of the working tool irrespective of the contour of the terrain traversed by the vehicle carrying such tool. This application constitutes a continuation-in-part of my copending application Ser. No. 468,821, filed July 1, 1965, and now abandoned, the disclosure of which is incorporated herein by reference.

As is completely described in the aforesaid copending application, I have discovered that extremely accurate elevation control of the earth moving blade of a road grader may be accomplished over a wide working area by sweeping a laser beam periodically over the working area at a known elevation, thus establishing a reference plane of laser energy, then detecting such beam by suitable photoelectric devices carried by the vehicle, which devices are not responsive to ambient light conditions, and then utilizing the signal generated by the photoelectric devices to control the elevation of the blade to cause such blade to always operate at a desired elevation, irrespective of irregularities in the terrain traversed by the grader. The same system is obviously applicable to any type of equipment where an adjustable elevation tool is carried by a freely moving vehicle.

There are several examples in the prior art of elevation controls for earth moving equipment which utilize an ordinary light beam or a radio frequency beam as a means for establishing a reference elevation plane over a working area; see, for example, U.S. Patent No. 3,000,121 to Martin et al., which discloses a system based on the utilization of two modulated light beams, and U.S. Patent No. 2,973,593 to Zellner et al., which utilizes a rotating "high frequency electromagnetic" beam which, from the apparatus shown, appears to lie in the ultra high or short wave radio frequency range. Either of these prior art systems suffer from well-recognized deficiencies which have thus far prevented the wide spread utilization of such devices in commercial operations.

The divergence of any known beam of ordinary light or radio frequency energy is so great that the beam detecting devices are only effective within a limited distance from the beam source or within a limited range along any selected portion of the beam length. For example, a so-called parallel beam of light produced by a high quality lense system may, for example, have a diameter of .25" when leaving the lens system, but at a distance of 100 feet the beam diameter will have increased to 25", and the photocell unit or units on which such beam is received does not know whether it is receiving the bottom .25" of the beam, or the top. A minimum practical working radius for most major construction jobs, and particularly highway construction, is on the order of 1,000 feet, so it is readily apparent that a plurality of light sources would have to be employed to permit simultaneous grading operations to be conducted over the entire working area by a number of machines, and then you would have the very difficult problem of two or more beams being received by the beam receiving device on any machine operating near the boundary of two or more of the control beams. The same divergence problem is encountered when using radio frequency or so-called short wave beams. Furthermore, it is not possible to produce a high intensity beam of ordinary light or radio frequency energy and limit the beam to an initial diameter of .25". To produce a high intensity light beam requires a large heated filament source, or an even larger carbon arc source. Beams produced by such physically large sources cannot be optically collimated into a small diameter, intense energy beam capable of being detected in daylight at distances up to 1,000 feet.

Only the laser beam has such a minimal divergence and high energy intensity as to permit a single laser beam to effectively and accurately control a plurality of implements moving independently in a working area of 1,000 feet or more in radius. Lastly, a control beam of ordinary light suffers greatly from the signal competition offered by ambient light. Certainly the effective range of an ordinary light beam on a bright sunshiny day will be greatly reduced; moreover the beam reception device will respond to accidental energization produced by the device being directly exposed to the sun, or to reflections from other components of the vehicle, or passing vehicles. In contrast, when using a laser beam as the reference plane, the photocell or cells to be energized by the laser beam may be positioned behind a narrow band pass optical filter which will permit substantially unimpeded passage of any light energy having the frequency of the laser beam, but will effectively screen out all effects of ambient light, thus permitting the control system to be equally effective on bright days as on cloudy days.

Most prior art control systems have suggested the direct mounting of the beam receiving device on or near the top surface of the blade or other tool being controlled. This necessarily means that the control beam must be reasonably close to ground level, hence subject to interruption by other vehicles, workmen, or other raised obstacles in the work area, such as trees, bushes, hummocks, etc.

Another feature of this invention is the provision of an adjustable height mast on the vehicle to mount the beam receiving cells in a highly elevated position relative to the ground level. This mast structure is mounted relative to the grader blade or similar working tool so as to duplicate all vertical movements of the tool, but nevertheless to be always maintained in an exactly vertical position irrespective of the vehicle position or the contour of the terrain over which the vehicle is operated. The elevation reference plane established by the rotating or oscillating laser beam may then be positioned high enough to clear all intervening obstacles and other vehicles, and, of course, at such height the dust concentration will be much less than that existing at ground level, so this potentially disturbing factor is minimized.

Accordingly, it is an object of this invention to provide an improved method and apparatus for automatically controlling the working height of a tool carried by a vehicle which is freely movable over a work area.

Another object of this invention is to provide an elevation control system for earthworking implements, paving machines, trenchers and the like by utilizing a rotating laser beam projected at a known elevation over the work area to provide an elevation reference plane.

A further object of this invention is to provide an improved correlation and assembly of a laser beam responsive control system relative to conventional earthworking equipment to permit such equipment to be operated automatically in response to the later beam or manually by the manual controls conventionally provided on such equipment.

A particular object of this invention is to provide a simple, economical adjustable height mast structure for carrying laser beam responsive devices on an earthworking implement together with improved means for automatically maintaining such mast structure in a true vertical relationship irrespective of the position of the vehicle carrying same.

Other objects and advantages of this invention will be apparent to those skilled in the art from the following detailed description taken in conjunction with the annexed sheets of drawings on which is shown a preferred embodiment of this invention.

On the drawings:

FIG. 1 is a perspective view of a conventional road grader with elevation control equipment embodying this invention assembled thereto;

FIG. 2 is an enlarged scale, vertical section perspective view of the control mast height adjusting mechanism;

FIG. 3 is a top elevational view of the manual control box for the mast height adjusting mechanism;

FIG. 5 is an enlarged, exploded perspective sectional view of the photocell housing mounted on top of the control mast;

FIG. 5A is a reduced vertical sectional view taken on the plane A—A of FIG. 5;

FIG. 6 is a vertical sectional view of the vertical pendulum sensing device provided to maintain the control mast at all times in a true vertical position, with the elements thereof shown in their neutral position;

FIG. 7 is a view similar to FIG. 5 but with the elements shown in the positions assumed when the mast departs from a true vertical position.

FIGS. 9 and 10 are respectively schematic views of conventional light and short wave beam arrangements.

As shown in the drawings:

Figure 8:
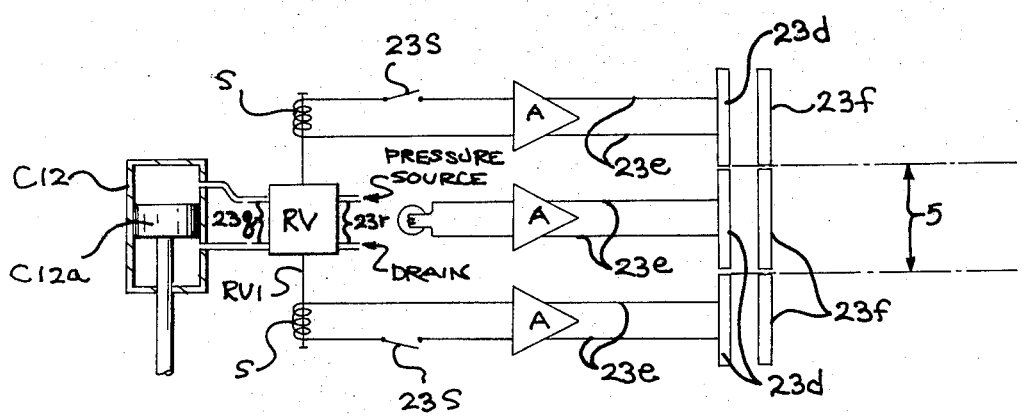
FIG. 8 is a schematic diagram illustrating the electrical and hydraulic circuits utilized to control the elevation of the grader blade in response to the signals generated by a laser beam responsive cell carried on the control mast.
Figure 4:
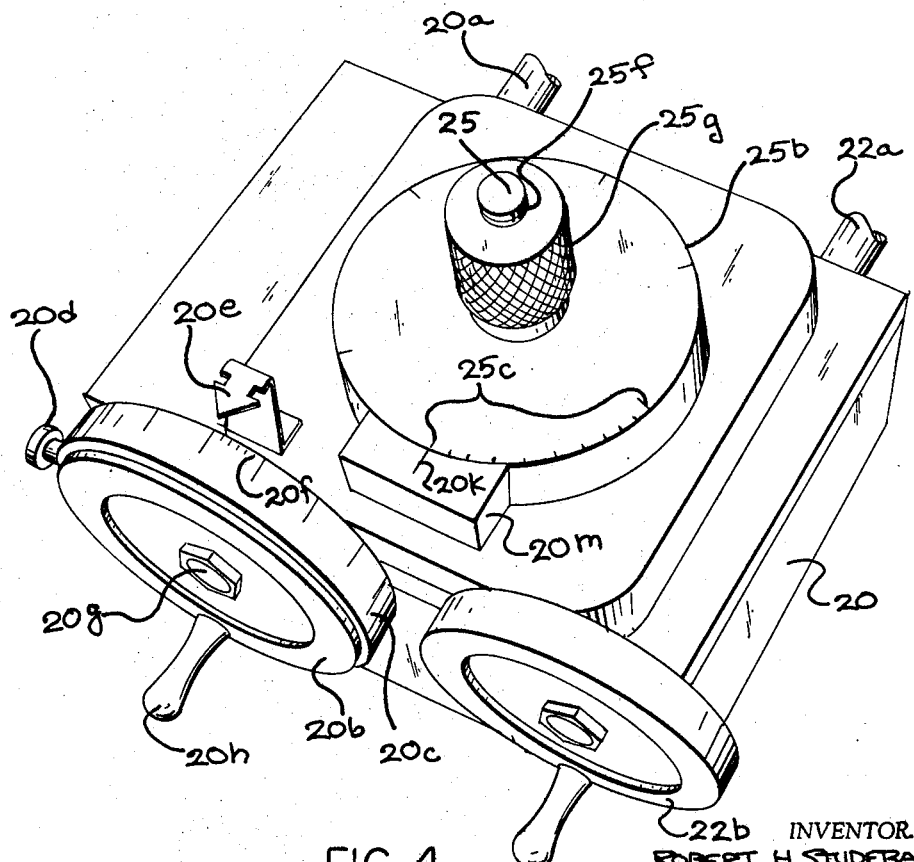
FIG. 4 is an enlarged perspective view of FIG. 3.

In FIG. 1 the reference numeral C represents a well-known motor grader manufactured and sold by the Caterpillar Tractor Company, of Peoria, Ill. All reference numerals bearing the prefix "C" represent conventional elements of such motor grader and hence will not be described in any detail. Grader C thus comprises a main frame member C1 supported by steerable front wheels C2 and by power driven rear wheels C3. An operator's cab C4 is mounted on frame element C1 just forward of the rear wheels C3 and houses the steering wheel C5 and all of the conventional manually operated hydraulic controls C6 utilized to control the height or elevation, pitch, tilt, and horizontal angular position of the grader blade C7. Blade C7 is conventionally supported in depending relationship on a circular subframe C8. Subframe C8 in turn is secured to a forwardly projecting tongue frame C9 which is secured at its forward end to main frame C1 by a universal pivot connection. The elevation of circular subframe C8, and hence the elevation of grader blade C7 is controlled by a pair of power actuated crank links C11, respectively mounted on opposite sides of main frame C1 and respectively connected to opposite sides of circular subframe C8 by links C13. Pivoting of crank links C11 in a vertical plane thus permits selective control of the elevation of either end of blade C7.

For the purpose of describing this invention with the greatest clarity, it will be assumed that the crank links C11 are each actuated by a hydraulic cylinder C12, which is only shown schematically in the control diagram of FIG. 8. Additionallly, it will be assumed that it is desired to automatically control the elevation of only one end of grader blade C7. With one end of the grader blade automatically following a desired elevation, it is a simple matter to control the relative elevaion of the other end of the blade to maintain the blade at any desired vertical plane angle. Of course, the elevation of both ends of the blade can be controlled by duplicating the hydraulic control arrangements to be hereafter described for one end of the blade.

In accordance with this invention a control mast 10 is provided comprising a lower tubular element 10a mounted at its bottom end by a universal pivot joint 11 to an angle iron 12 which is welded to the periphery of circular subframe C8 in the vicinity of the end of blade C7 which is to be automatically controlled. Control mast 10 is maintained in a vertical position by the coaction of two hydraulic positioning cylinders 13a and 13b which are disposed in mutually perpendicular vertical planes and are connected to a collar 13 slidably mounted on control mast 10 by universal pivots 11c and 11d respectively. The other end of cylinder 13a is connected to angle iron 12 by a universal pivot 11a, while the other end of cylinder 13b is pivoted to a bracket 13c, welded to subframe C8, through a universal pivot 11b. Hydraulic fluid is supplied to cylinders 13a and 13b through conduits 14a, 14b, 14c and 14d and is controlled by a vertical sensing device 15, which is rigidly secured to control mast 10 by brackets 15t, and which will be described later in detail. For the present it should be noticed that the control mast 10 moves concurrently with the adjacent end of the grader blade C7 so far as all vertical displacements are concerned, yet the position of the control mast 10 relative to the true vertical may be independently adjusted by the cylinders 13a and 13b.

Referring to FIGS. 6 and 7, there is shown the internal construction of the vertical sensing device 15. Of course, a gyro operated sensing device could be utilized, but such devices are expensive and generally too delicate in construction to withstand the jars and shocks encountered on any earthworking implement. Device 15 comprises an elongated cylindrical housing including a cup-shaped bottom portion 15a, a cylindrical central valve housing 15b, and an inverted cup-shaped top portion 15c. Valve housing 15b defines top and bottom annular recesses 15d and 15e which respectively snugly receive the rim portions of top portion 15b and bottom portion 15a, and are secured thereto by a plurality of radial bolts 15f.

A pendulum 30 is provided comprising a heavy cylindrical weight portion 30a and an axial supporting rod 30b which projects through an enlarged aperture 15h in valve housing 15b. Support rod 30b has its top end secured to a universal pivot 30c which in turn is supported by a bolt 30d which traverses an axial hole in the top wall 15g of the housing. Pendulum weight 30a is substantially smaller in diameter than the interior of housing 15a and hence can freely shift its position relative to the housing whenever the axis of the housing departs from the true vertical. To damp the free movements of pendulum 30, the bottom of the housing is filled with a relatively viscous fluid 30e up to a level at least covering the pendulum weight 30a.

Four radial valve bores 15j are formed in valve housing 15b which are exactly 90° displaced from each other.

Each valve bore 15j is provided with three axially spaced annular grooves, respectively 15k, 15m, and 15n. A radial port 15p connects the central groove 15m of one bore to the hydraulic pipe 14a which connects to one end of mast positioning cylinder 13a. Similar connections are made between pipes 14b, 14c, and 14d and the central groove 15m of the other valve bores. The end grooves 15k are respectively connected to the pressured side of the grader's hydraulic system by radial bores 15r and pipes 14e, while the other end grooves 15n are respectively connected to the drain side of the grader's hydraulic system by radial bores 15s and pipes 14f.

Four identical sliding valves 31 are provided which are respectively snugly, but slidably received in the valve bores 15j. The inner ends 31a of valves 31 have a rounded configuration and are held lightly against the adjacent portion of pendulum rod 30b by a spring 31b which is mounted in a recess 31c in the outer end of valve 31 and bottoms against a plug 31d which is threaded into a counterbore at the outer end of each bore 15j.

Each valve 31 is further provided with a pair of axially spaced grooves 31e which are of greater axial length than the distance between the adjacent bore grooves 15k–15m and 15m–15n, and the axial separation of grooves 31e is of greater length than the center bore groove 15m. Thus, when the pendulum 90 is concentrically disposed relative to housings 15a and 15c, as illustrated in FIG. 6, no fluid can be supplied to or removed from the positioning cylinders 13a and 13b because the radial ports 15p are respectively closed by that portion 31f of valve 31 that lies intermediate the valve grooves 31e. However, when the control mast 10 departs from a true vertical position, as illustrated in FIG. 7, the piston 30 shifts its position relative to the housing and hence piston rod 30b moves laterally and causes a following movement of all the valves 31. The resulting movements of valves 31 results in an unblocking of the ports 15p, and hydraulic fluid is supplied to one end of positioning cylinders 13a and 13b and removed from the opposite ends to actuate such cylinders in the proper direction to return the control mast 10 to a true vertical position where piston rod 30b again positions all the valves 31 in their inoperative position shown in FIG. 6.

When the grader hydraulic system is not operating and fluid leakage permits either or both positioning cylinders 13a and 13b to gradually change their positions, the control mast 10 may move from its vertical position and thus activate valves 31 to drain fluid from both cylinders 13a and 13b and permit mast 10 to fall. To prevent this, a small cylinder 32 is mounted in the bottom center of lower housing 15a. The piston rod 32a of cylinder 32 is spring biased into engagement with a recess 30f in the base of pendulum weight 30a but is retracted from engagement therewith by fluid pressure provided from the grader hydraulic system through pipe 32c. Whenever the hydraulic system is inoperative, spring 30b moves piston rod 32a into locking engagement with recess 30f.

The lower portion of control mast 10 is topped by a gear housing 16 which is shown in detail in FIG. 2. Housing 16 defines a vertical bore 16a extending completely through the housing and having its lower portion counterbored as indicated at 16b to snugly receive the top end portion of control mast tube 10a. Set screws 16c secure housing 16 firmly onto tube 10a.

The upper part of control mast 10 comprises an elongated rod 17 which has circular rack teeth 16a formed on most of its lower portion and is journalled for both axial and rotational movements within the bore 10b of control mast tube 10a and also by housing bore 16a.

Housing 16 defines a lower gear chamber 16d in which a horizontal shaft 18 is suitably journalled. A spur gear 18a is secured to one end of shaft 18 and this gear projects through an elongated slot 10e in the wall of mast tube 10a to engage the circular rack teeth 17a. Thus rotation of shaft 18 effects axial displacement of rod 17, but does not change the angular position of the rod 17 about its axis. To rotate shaft 18, a spur gear 18b is mounted on the other end of the shaft and gear 18b is in turn rotated by worm gear 19 which is secured to an end of an actuating rod 19a which projects into gear chamber 16d through a suitable bushing 16e. Rod 19a is rotated by the output shaft 20a of a manual control box 20 which is mounted in an operator accessible position in the cab C4 of the motor grader. An intermediate shaft 19b and two universal joints 19c complete the actuating chain for controlling the vertical position of rod portion 17 of the control shaft 10.

Shaft 20a extends transversely through manual control box 20 and is suitably journalled therein. The end of the shaft projecting into the interior of grader cab C4 is reduced and threaded and a circular crank disc 20b is mounted on such projecting end and secured thereto by a nut 20s. A crank handle 20n is threaded into the disc 20b adjacent its periphery. Additionally, a generally cup-shaped indicia carrying disc 20c is freely mounted on shaft 20a behind the crank disc 20b and in surrounding relationship thereto and may be locked at any selected angular position relative to the crank disc 20b by a finger operated radial set screw 20d. A pointer 20e is provided on the top of control box 20 to cooperate with the indicia 20f provided on the axial peripheral surface of the indicia disc 20c.

Within the hollow interior of control box 20 a vertical shaft 25 is suitably journalled and projects through the top wall of the control box 20. A large spur gear 25a is keyed to shaft 25 and arranged to be driven by a worm gear 20h provided on shaft 20a. An indicating dial 25b carrying graduations 25c is freely mounted on the top projecting end of shaft 25 and lays against an integral shoulder (not shown) provided on such shaft. The top end of shaft 25a is threaded as indicated at 25f and a finger operated nut 25g cooperates with such thread to permit the indicating dial 25b to be locked to shaft 25 at any selected angular position. A zero reference mark 20k is provided on a block 20m mounted on the top of box 20 at any convenient position adjacent dial 25b.

The gear ratio between spur gear 8a and rack teeth 17a, together with the gear ratio between spur gear 18b and worm gear 19 is selected so that a full 360° turn of the crank disc 20b will result in a change in vertical position of rod 17 of $\frac{1}{10}$ of a foot. The gear ratio between worm 20f and gear 25a may conveniently be selected to be 1 to 60 so that a full 360° revolution of the dial 25b represents a change in elevation of six feet. Thus the indicia 25c provided on dial 25b may be graduated in divisions representing tenths of a foot of vertical movement of the rod portion 17 of control mast 10 while the indicia graduations 20f provided on the indicia disc 20c may be graduated in one hundredths of a foot. It will therefore be apparent that very accurate vertical adjustment of the rod portion 17 of the control mast 10 may be manually effected by the aforedescribed arrangement.

Housing 16 also defines an upper gear chamber 16f into which an actuating rod 21 projects through a bushing 16g. A worm gear 21a on the end of actuating rod 21 engages a spur gear 17b slidably, but non-rotatably secured to rod portion 17 by a key (not shown) which is slidably engaged in an axial extending slot 17c which is cut through the circular rack teeth 17a. Thus rod portion 17 of control mast 10 may be rotated by actuating rod 21 without interfering with the vertical position of such rod portion. Actuating rod 21 is rotated by a shaft 22a journalled in one side of manual control box 20 and having a crank wheel 22b secured thereto. An intermediate shaft 21c and two universal joints 21d complete the actuating train for controlling the angular position of rod portion 17 of the control shaft 10.

On the top of rod portion 17 a photocell housing 23 is rigidly mounted, having three vertical walls 23a and top and bottom wall 23b. A mounting plate 23c is positioned in the housing opposite its open vertical side and a plurality of beam responsive cells, here shown as three vertically aligned units 23d are mounted in a suitable vertical groove 23m in plate 23c. Such cells may comprise any known device that will generate a voltage or change its electrical properties when a laser beam is incident thereon. Selenium or silicon photocell units are preferred.

A second groove 23n is plate 23c mounts either a single sheet of optical filter glass or an assembly of small pieces 23f, directly in front of the photocells 23d. In either event the optical characteristics of the filters 23f are those of a narrow band pass filter having greatest light transmission to frequencies corresponding to the single frequency of the laser beam. As a result, all normal ambient light, such as sunlight in daylight operations, or photoflood lights lights in night time operations, are effectively blocked by the filters 23f from passing through to the photocells 23d. To minimize accidental reflections of the incident laser beam all exposed internal surfaces of housing 23 have a black coating, and black dividers 23p may be provided intermeriate the photocells 23d. Electrical leads 23e connect each of the photocells 23d to suitable amplifying units A which are preferably mounted in the cab C4 of the grader at some protected location therein, for example, adjacent the roof of the cab. The details of the electrical and hydraulic circuits provided to permit the signals generated by the photocells 23d to control the elevation of one end of the grader blade C7 will be described later.

Also a tubular, accordion shaped, flexible cover 17h is mounted around those portions of rod 17 that at any time lie intermediate the gear housing 16 and the photocell housing 23 to prevent any dust collecting on such rod portion to interfere with the sliding and rotational movement of rod portion 17 in its bearings.

To operate a motor grader or similar implement in accordance with this invention, a laser beam generator (not shown) is set up at a central location in the work area. Such generator may, for example, be the type described in detail in my copending application Ser. No. 474,684, filed July 26, 1965. In any event a laser beam reference plane is produced by sweeping a laser beam 5 (FIG. 8) over the work area at a known elevation. This signal beam can then be utilized to operate any number of working implements equipped with the control system of this invention and moving independently in the work area.

It is important that the total height of the central photocell unit 23d be at least equal to the minimum thickness (height) of the laser beam 5 at all points in the work area. This insures that at any time the optical center of central photocell 23d departs from a position of exact vertical alignment with the center of incident laser beam 5, one or the other of the two adjacent photocell units 23d will be energized to a greater or lesser extent.

In other words, the vertical spacing between top and bottom photocells 23d should not be greater than the minimum vertical thickness of the laster beam 5 at any point in the desired working area.

The effective height of each of the top and bottom photocells 23d should be at least equal to the maximum depth of cut that the grader can make.

A conventional detector and amplifying device A is electrically connected to each of the photocell units 23d by leads 23e and translates the signals generated in the respective photocell unit by the incident laser beam into a usable electrical signal. The signal generated by the central photocell unit 23d and its associated amplifier A is utilized merely to energize an indicating light L which is positioned in the cab C4 at a position where it is always observable by the operator. So long as the light L is energized, the operator is assured that at least a portion of the central photocell 23d is aligned with the laser beam 5.

The amplified signals from the top and bottom photocells 23d are applied through switches 23s in opposing relationship to a conventional hydraulic reversing valve RV as by solenoid coils S respectively applied in conventional fashion to the opposite extremities of a rod RV1 which is connected to the sliding shuttle valve (not shown) of a conventional hydraulic reversing valve RV. Suitable hydraulic connections 23r are provided between the reversing valve RV and the input and output sides of the hydraulic system carried by the grader and designed respectively as the pressure and drain connections in FIG. 8. Hydraulic connections 23q connect the reversing valve RV respectively to opposite sides of the piston C12a of the main elevation control cylinder C12 (shown only schematically) that is provided on the grader to control the elevation of one side of the grader blade C7.

From the foregoing description, it is apparent that whenever the photocell housing 23 vertically departs from a position in which the central photocell 23d is exactly aligned with the center of the incident laser beam 5, either the upper or the lower photocell 23d will be energized to a greater extent and this will produce a shifting of the control rod RV1 of the reversing valve RV in the proper direction to in turn introduce pressurized hydraulic fluid to the proper side of the piston C12a of the blade lifting cylinder C12 and thus effect movement of the associated end of the blade C7 in the proper direction to return the blade to the desired elevation and concurrently to move the control mast 10 to restore the photocells 23d to a position where the central photocell is aligned with the exact center of the laser beam 5.

The operation of equipment incorporating this invention will now be described. The grader operator first positions are grader with its blade C7 resting on the ground at a point in the working area where the ground elevation is known. This elevation may very conveniently be determnied from the overhead laser beam 5 by utilizing a surveyor's rod carrying laser beam responsive mechanism such, for example, as is fully described in my copending application Ser. No. 532,944 filed on Mar. 9, 1966 and entitled "Method and Apparatus for Indicating the Center of Radiant Energy Beam."

The grader operator then manually turns the control handle 22a of gear box 22 to angularly position the control mast 10 so that the photocells 23d are generally facing the laser beam generator; however, this alignment does not have to be precise since the beam is continously moving in a circular path.

The operator then turns the crank disc 20b of manual control box 20 to raise or lower the rod portion 17 of control mast 10 until the laser beam 5 is detected, as indicated by the energization of indicator lamp L. During this manipulation, the switches 23s in the output circuits of the amplifiers A supplied by the upper and lower photocells 23d are opened so as to prevent the automatic control system from taking over and attempting to change the vertical position of the control mast 10. Alternatively, the operator may disconnect, by a suitable valve (not shown) the supply of pressurized fluid from the graders hydraulic system to the blade lifting cylinder C12. If the grader happens to be located at a fairly remote position with respect to the source of laser beam 5, so that the thickness (height) of the laser beam 5 is somewhat greater than the height of the middle photocell 23d, the operator may effectively align the optical center of the middle photocell 23d with the center of the laser beam 5 by first noting the position of pointer 20e relative to the indicia disc 20c when the indicator lamp L is initially lighted, then continuing the rotation of crank disc 20b to move the central photocell 23d vertically through the height of the laser beam 5 until the indicator lamp L is de-energized. The reading of pointer 20e on the indicia disc 20c is then noted at this point and then crank disc 20b is turned in reverse to a point exactly half-way between the two readings. The indicia disc 20c is then freed for rotation relative to the crank disc 20b by loosening the set screw 20d, the zero indicia on the indicia disc 20c is aligned with the pointer 20e, and screw 20d is re-tightened. Finally the finger nut 25d is loosened and dial 25a is turned to align its zero indicia with the mark 20k. At this stage, the exact vertical displacement of the bottom edge of grader blade C7 relative to the center of laser beam 5 is computable by merely subtracting the known elevation of the ground on which the blade is resting from the known elevation of the laser beam.

The grader is then driven to the desired work area. The desired initial cut, say for example, .35 feet, is fed into the mast height control system by rotating crank disc 20b in the direction to raise control mast 10 until the indicating dial 25b is registering midway between .3 and .4 feet and the indicia disc 20c is registering .050 feet.

The automatic control system is then rendered operative by either closing the amplifier switches 23s or opening the valve (not shown) to connect the blade height actuating cylinder C12 to the grader hydraulic system. The operator then drives the grader over the desired work area and only needs to occasionally align the angular position of control mast 10 to face the laser beam source by turning crank disc 22.

Since the laser beam 5 will be initially striking the lower photocell 23d, the automatic control system will immediately function to energize the reversing valve RV in a direction to lower the grader blade C7, and hence lower the control mast 10 until the optical axis of the center photocell 23d is aligned with the center of the laser beam 5. The grader blade C7 will then be positioned to make a cut exactly equivalent to that dialed into the system by the previously described manipulation of the crank disc 20b. If the wheels of the grader encounter a rise in the terrain, this would have the initial effect of raising the control mast 10 and hence causing a greater portion of the laser beam 5 to strike the bottom photocell 23d. This will again actuate the reversing valve RV in the proper direction to lower the grader blade C7 to maintain it at the desired elevation and concurrently to lower the control mast 10 and realign the central photocell 23d with the center of the laser beam 5. Conversely, if the wheels of the grader encounter downwardly sloping terrain, a greater portion of the laser beam 5 will strike the upper photocell 23d. This will cause an actuation of the control valve RV in the direction to raise the grader blade C7 to maintain it at the desired elevation and, concurrently, will raise the control mast 10 to reposition the central photocell 23d in exact alignment with the center of the laser beam 5.

After completion of the aforedescribed first cut, the relative elevation of the grader blade may then be adjusted by a small amount, say .05 feet, to make the second and finishing cut over the working area. This is accomplished by the operator merely turning the crank disc 20b to bring the 0.4 foot graduation on the dial 25a into alignment with the mark 20k and the zero graduation on the indicia disc 20c into alignment with the pointer 20e. The grader can then be traversed over the work area and will make the final finishing cut of .05 feet.

With the aforedescribed apparatus, it is apparent that this invention provides a new method of controlling the working height of a vertically adjustable tool carried by a vehicle which is freely moving over a work area underlying the laser energy plane established by the rotating laser beam 5. Such method may be generally described as encompassing the steps of continuously sweeping a laser beam at a known height over the working area, then controlling the height of the tool as a direct function of the vertical displacement of the beam detecting photocells 23d relative to the laser energy plane, concurrently moving the beam responsive photocells 23d in exact synchronism with the vertical movements of the tool, and lastly, manually changing, through manipulation of the crank dial 20b, the relative vertical displacement of the photocells 23d and the tool by successive increments corresponding to the desired successive cuts to be performed by the tool.

Those skilled in the art will recognize that this method can be readily adopted to achieve completely automatic programmed operation of a grader. Instead of manually feeding into the control system the successive depths of cut, such information could be applied to control shaft 20a by a servomotor which in turn is controlled by a programmed tape. Such techniques and equipment are well known and require no detailed description.

The previously mentioned deficiencies of the prior art radiant energy control systems can be readily appreciated by referring to the conventional beam-producing arrangements shown in FIGURES 9 and 10 of the drawings and making a few simple calculations. FIGURE 9 shows schematically a system for producing a beam of ordinary light. The light source F necessarily has to have a discrete dimension, indicated as $L_1$. It will also necessarily be located a distance $D_1$ from the lens. As a result, the fundamental law of optics teaches that at any distance $D_2$ from the lens, the beam image $F_1$ will be produced having a physical dimension $L_2$. The relationship between the size of image $L_2$ and the distance $D_2$ is expressed by the following simple equation:

$$\frac{L_1}{D_1} = \frac{L_2}{D_2}$$

which may be converted to:

$$L_2 = \frac{L_1 D_2}{D_1}$$

Assuming that light source F could be found that would produce enough energy to be detected at 1000 ft., and that such light source had a minimum height $L_1$ of .25" and was located a distance $D_1$ of one foot from the lens, then when $D_2$ equals 1000 ft., $L_2$ will be equal to 20.8 ft. It can be readily seen that a light beam of such width, even if it could be detected in daylight, would be completely incapable of controlling the elevation of a working tool to the required accuracy of plus or minus ¼".

Referring to FIGURE 10, there is shown a conventional arrangement for projecting a microwave beam. An antenna A is shown, which for efficient transmission purposes must have a height of one-half wave length or $\lambda/2$. A spherical segment reflector R is placed behind such antenna and the vertical chordal distance of such spherical segment is represented by the dimension D. With such an arrangement, the resulting divergence angle $\theta$ of the reflected beam is expressed by the equation:

$$\theta = \lambda/2D$$

Any practical, and relatively inexpensive, transmitter that is commercially available will have a wave length in excess of 2.5 cm. Hence, assuming that a minimum wave length transmitter is employed where $\lambda$ equals 2.5 cm., the above equation reduces to $\theta = 1.25/D$. It will thus be seen that the smaller dimension D is made, the greater will be the divergence angle. Hence, for a minimum divergence system which still does not involve an excessively large reflector, assume that $D = 100$ cm. At the same time, the larger the reflector, the greater will be the beam width (height) at any point. The angle $\theta$ then equals .0125 radians or 0.70°. Simple calculations will show that the resulting beam height H at 1000 ft. will be equal to 45.2 ft. Again, this great divergence of the beam will make it impossible to use the beam at all distances, say from 50 ft. from the transmitter to 1000 ft., and effect vertical control of the working tool of an implement to an accuracy of plus or minus .25".

Lastly, any short wave beam will reflect from any object in the area and produce ghost signals regardless of where the reflecting object is located relative to the beam responsive device, therefore, in the normal construction work area there would be literally a multitude of ghost signals produced by reflections from telephone or power lines, trees, buildings, or other vehicles working in the area, and the ghost signals would make the accuracy of any beam-responsive device completely unpredictable.

In contrast, a laser beam of initial .25″ height theoretically diverges only to 1″ height at a distance of 1000 feet. Reflections of the beam that would affect the beam-receiving photocells could only occur off polished surfaces that are exactly vertical.

From the foregoing description, it will be apparent to those skilled in the art that this invention provides a greatly improved method and apparatus for the automatic control of graders and similar equipment, and that many embodiments of this invention, including programmed automatic control of grading operations, may be utilized.

What is claimed is:

1. Automatic height control for a tool carried by a vehicle moving under a reference plane defined by a laser beam comprising:
    (1) power means for raising or lowering said tool relative to the vehicle;
    (2) beam receiving means for generating control signals which change in character depending upon the vertical position of the beam relative thereto;
    (3) a mast for supporting said beam receiving means;
    (4) means for shiftably mounting said mast on the vehicle;
    (5) means for automatically maintaining said mast in a fixed relationship to the true vertical irrespective of the terrain traversed by the vehicle; and
    (6) means responsive to said control signals for controlling said power means to maintain said tool at a fixed vertical displacement relative to said reference plane.

2. The combination defined in claim 1 plus manually operable means for accurately, incrementally adjusting the effective height of said mast.

3. The combination defined in claim 1 wherein said beam receiving means includes two vertically aligned and spaced photocells, the spacing of said photocells being not greater than the vertical thickness of the laser beam at any point in the desired working area.

4. The combination defined in claim 3 plus a third photocell disposed in said space between said two photocells, and indicator means actuated by said third photocell when the laser beam is incident thereon.

5. The combination comprising:
    (1) means producing a laser beam moving continuously over a work area at a selected fixed elevation, thereby defining a reference plane of laser energy;
    (2) a vehicle movable in said work area and having an operator's station;
    (3) a tool carried by said vehicle and vertically adjustable relative thereto;
    (4) power means, including a first manually operated control member at said operator's station for raising or lowering said tool;
    (5) beam responsive means for generating control signals which change in character depending upon the vertical position of such means relative to said reference plane;
    (6) means connecting said beam responsive means to said tool for concurrent vertical movement;
    (7) means including a second manually operable control member at said operator's station for accurately, incrementally adjusting the height of said beam responsive means relative to said tool;
    (8) means at said operator's station for accurately indicating the selected height of said beam responsive means; and
    (9) means for controlling said power means in response to said control signals, whereby said tool may be maintained at any operator selected vertical displacement relative to said reference plane.

6. The combination defined in claim 5 wherein said beam responsive means includes two vertically aligned and spaced photocells, the spacing of said photocells being not greater than the vertical thickness of the laser beam at any point in the desired working area.

7. The combination defined in claim 6 plus a third photocell disposed in said space between said two photocells, and indicator means actuated by said third photocell when the laser beam is incident thereon.

8. The combination comprising:
    (1) means producing a laser beam moving continuously over a work area at a selected fixed elevation, thereby defining a reference plane of laser energy;
    (2) a vehicle movable in said work area;
    (3) a tool carried by said vehicle and vertically adjustable relative thereto;
    (4) power means for raising or lowering said tool;
    (5) an upstanding adjustable height mast on said vehicle mounted for concurrent vertical movement with said tool;
    (6) beam receiving means mounted on said mast for generating control signals which change in character depending upon the vertical position of such means relative to said reference plane;
    (7) means for adjusting the height of said mast, whereby the vertical position of said beam responsive means may be varied relative to said tool;
    (8) means for maintaining said mast in a true vertical position irrespective of the terrain traversed by the vehicle, and
    (9) means for controlling said power means in response to said control signals, whereby said tool may be maintained at any selected vertical displacement relative to said reference plane.

9. The combination defined in claim 8, wherein said means for adjusting the height of said mast is manually operable by the vehicle operator.

10. The method of controlling the working height of a vertically adjustable tool on a vehicle freely moving over a work area, said vehicle having laser beam responsive means mounted on the top of an upstanding mast, comprising the steps of:
    (1) continuously sweeping a laser beam at a known height over the working area;
    (2) moving said mast vertically in exact synchronism with the vertical movements of the tool;
    (3) controlling the height of said tool as a direct function of the vertical displacement of the beam responsive unit relative to the laser beam; and
    (4) continuously maintaining the mast in a true vertical position.

11. The method defined in claim 10 plus the step of changing the effective length of said mast by successive increments corresponding to the desired successive working elevations of the tool.

References Cited

UNITED STATES PATENTS

| | | | |
|---|---|---|---|
| 2,661,653 | 12/1953 | Castiglia | 248—11 X |
| 2,874,789 | 2/1959 | Hershman. | |
| 3,046,681 | 7/1962 | Kutzler | 172—4.5 |
| 2,916,836 | 12/1959 | Stewart et al. | 37—143 |
| 2,973,593 | 3/1961 | Zellner et al. | 37—144 |
| 3,094,796 | 6/1963 | Atchley | 37—156 |
| 3,321,248 | 5/1967 | Williamson et al. | 299—1 |

ANTONIO F. GUIDA, Primary Examiner

ALAN E. KOPECKI, Assistant Examiner

PO-1050
(5/69)

UNITED STATES PATENT OFFICE
CERTIFICATE OF CORRECTION

Patent No. 3,494,426        Dated February 10, 1970

Inventor(s) Robert H. Studebaker

It is certified that error appears in the above-identified patent and that said Letters Patent are hereby corrected as shown below:

The inventor's initials on the headings of the drawings are erroneously shown as "P. H. Studebaker." The correct initials are "R. H." Studebaker.

SIGNED AND SEALED
JUL 7 1970

(SEAL)
Attest:

Edward M. Fletcher, Jr.
Attesting Officer

WILLIAM E. SCHUYLER, JR.
Commissioner of Patents